United States Patent [19]

Marr

[11] Patent Number: 4,565,593

[45] Date of Patent: Jan. 21, 1986

[54] CONNECTION AND INSPECTION OF OPTICAL FIBRES BY FUSION SPLICING

[75] Inventor: Donald Marr, Ufford, Great Britain

[73] Assignee: British Telecommunications, London, England

[21] Appl. No.: 539,166

[22] Filed: Oct. 5, 1983

[30] Foreign Application Priority Data

Oct. 8, 1982 [GB] United Kingdom ............... 8228877

[51] Int. Cl.[4] ............................................ B65H 69/06
[52] U.S. Cl. ..................... 156/64; 156/158; 350/96.19; 350/96.21; 356/73.1; 362/32
[58] Field of Search ............... 156/64, 158; 350/96.19, 350/96.21; 356/73.1; 362/32, 267

[56] References Cited

U.S. PATENT DOCUMENTS 4,102,717 7/1978 Hensel .......................... 156/158 X
4,432,601 2/1984 Mannschke ..................... 350/96.19

FOREIGN PATENT DOCUMENTS 2046466 2/1983 United Kingdom .

OTHER PUBLICATIONS

Patent Abstracts of Japan, vol. 6, No. 112, Jun. 23, 1982, pp. 46P124, & JP-A-57 41 606 (Nippon Denshin Denwa Kosha) figures 1, 2.
Patent Abstracts of Japan, vol. 6, No. 112, Jun. 23, 1982, pp. 97P124, & JP-A-57 42 013 (Dainichi Nippon Densen K.K.).
Patent Abstracts of Japan, vol. 5, No. 56, Apr. 17, 1981, pp. 138P57, & JP-A-56 11 423 (Nippon Denshin Denwa Kosha).
Research Disclosure, No. 216, Apr. 1982, Havant, Hamps (GB) "Automatic Positioning and Alignment Equipment for Optical Fibres", p. 131, lines 45-47; figure 7.

*Primary Examiner*—Robert A. Dawson
*Attorney, Agent, or Firm*—Cushman, Darby & Cushman

[57] ABSTRACT

Inspection of a fusion splice between the ends of two optical fibres, said splice being reinforced by a support member, is facilitated. In particular, inspection of the joint between the optical fibre cores in a fusion splice is facilitated. The splice is held in a transparent support member by means of a transparent adhesive matched in refractive index to the cladding of the fibre. Apparatus is described which allows the splice to be viewed in two directions at right angles by means of a microscope whose position may be adjusted therefor without rotation relative to the support member. The arrangement is of particular relevance to splices between monomode fibres whose small core diameters call for a high degree of precision in jointing in order to avoid optical loss.

20 Claims, 6 Drawing Figures

CONNECTION AND INSPECTION OF OPTICAL FIBRES BY FUSION SPLICING

The present invention relates to the connection of optical fibres by fusion splicing. Optical fibres comprise a core and a cladding (usually of silica or borosilicate glass) and are in practice provided with one or more coatings for protection. For use in the field, the coated optical fibres are usually cabled for longitudinal strength and additional protection.

The present invention relates to particular to the connection of monomode fibres. Monomode fibres are optical fibres which can be used to transmit light of preselected wavelength, for instance 1.3 μm, in a single transmission mode. An important feature in the design of such fibres is the small size of the fibre core diameter in comparison with multimode fibres (which will transmit light in more than one transmission mode). For instance, where a multimode fibre may typically have a core diameter lying in the range 50 μm to 100 μm, a monomode fibre will often have a core diameter of 10 μms or less.

The splicing of optical fibres by fusion is a known technique. Especially if the fibres are monomode fibres, because of the small core dimeters, the splicing must be performed with a high degree of precision if optical loss is to be low. Loss is likely to arise from misalignment of the cores of the two fibres being spliced, from deformation of the cores so that they do not meet coaxially, and from combinations of these effects.

The present invention provides a method of connecting two optical fibres which comprises the steps of:
 (i) fusion splicing the ends of the fibres, and
 (ii) fixing the splice and the adjacent portions of the two fibres in a transparent support member by means of a transparent adhesive matched in refractive index to the cladding of the fibre.

A connection thus made can be inspected by means of a microscope for such defects as tend to cause loss. Further, a connection thus made can be inspected by means of light transmitted through the region of the splice. Inspection by means of transmitted light can allow considerably more information to be gained about the condition of the splice, and in particular about the joint between the cores in the splice, than inspection by means of reflected light.

It is to be understood that the term "matched in refractive index to the cladding of the fibre" refers to a degree of matching sufficient to avoid refraction effects at the curved fibre surface that would prevent satisfactory observation of the core. The suitability or otherwise of the refractive index of a particular adhesive for a particular combination of optical fibre and support member can be readily determined by simple trial and error. If one wishes to select a particular adhesive from a range of adhesives of differing refractive index, the use of a comparable range of model liquids is convenient to expedite the trial and error experiments.

The advantage of such inspection is especially great for submarine optical fibre cables where the expense of ceasing to use an optical fibre having a unsatisfactory splice is very high, as is the cost of retrieving the cable for repair.

Conveniently, the support member has a channel, for example one of square or rectangular cross section, in which the splice and the adjacent portions of the two fibres are fixed. Preferably, the support member is elongate with a square of rectangular cross-section save for the channel in one of the four longitudinal faces. A cover plate may be used to complete enclosure of the fibre and adhesive.

Planar faces of the support member or cover plate may be used, in combination with a 45° prism, to inspect the splice from two directions at right angles without the need for relative rotation of the connection and the microscope. Likewise, relative rotation of the illuminating light source and the connection may be avoided.

This simplifies the inspection apparatus and/or avoids the need for excessive handling of the connection after it is complete, the latter constituting a potential risk to the fibres (excessive bending of which could cause microcracks that would ultimately lead to failure).

The present invention is advantageously used in combination with the invention of our copending European patent application No. 82 303 007.7, the disclosure of which is incorporated herein by this reference. Like the present invention, the previous invention relates primarily to submarine cables. By the use of the previous invention, it is possible to fix the relative positions of two cable ends that are to be joined before the individual optical fibre "tails" from each cable end are fusion spliced, thereby eliminating the risk of damage to the fusion splices due to relative movement of the cables. After each splice is made, it may be conveniently located in a slot on the outside of a bobbin whose position relative to the cable ends is fixed, thereby further protecting it against damage, e.g. while the remaining fusion splices are being made.

If, then, the present invention is being used in combination with this previous invention, it is advantageous for the slots on the bobbin to be suitable for receiving the support member in accordance with the present invention, thereby offering a convenient means of locating the splices after inspection.

Suitable materials for the support member and cover plate are borosilicate glass and silica. Suitable adhesives are epoxy and silicone resins, cured by heat or with ultraviolet radiation as appropriate.

The present invention will now be more particularly described by way of example only, with respect to the accompanying Figures of which:

Figure 2:
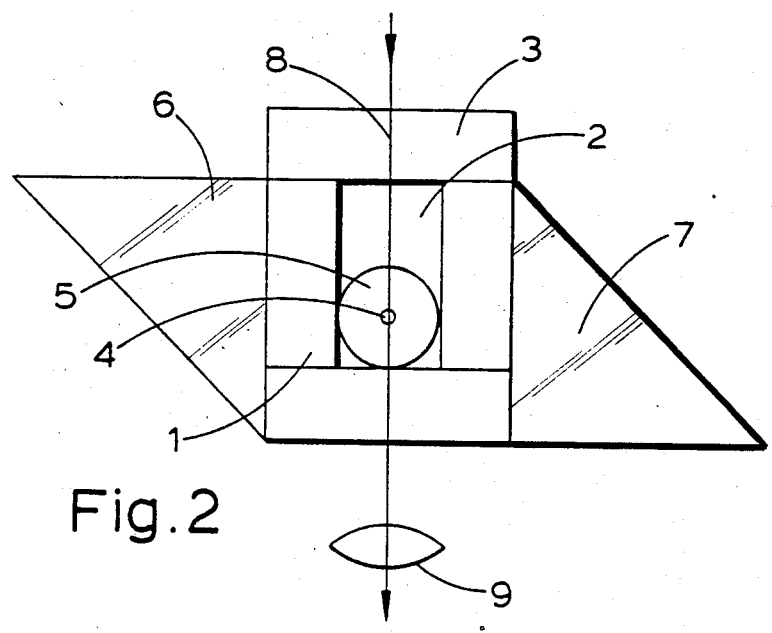
FIG. 2 shows in section an arrangement for inspection of a splice by means of a microscope.
Figure 3:
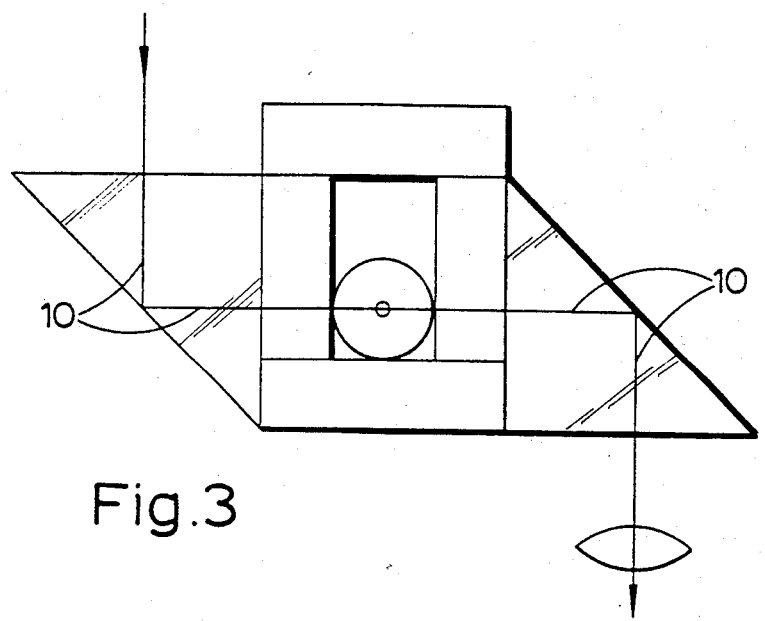
FIG. 3 shows in section an arrangement for inspection of the same splice in a direction at right angles to the direction of inspection in FIG. 2, differing from the FIG. 2 arrangement only in lateral movements of the microscope objective and source.

It should be noted that in FIGS. 2 and 3 section hatching is omitted for the sake of clarity. The only part of the figure not cut by the section is the annular area marked 5 in FIG. 2 and the corresponding area in FIG. 3.

Figure 1:
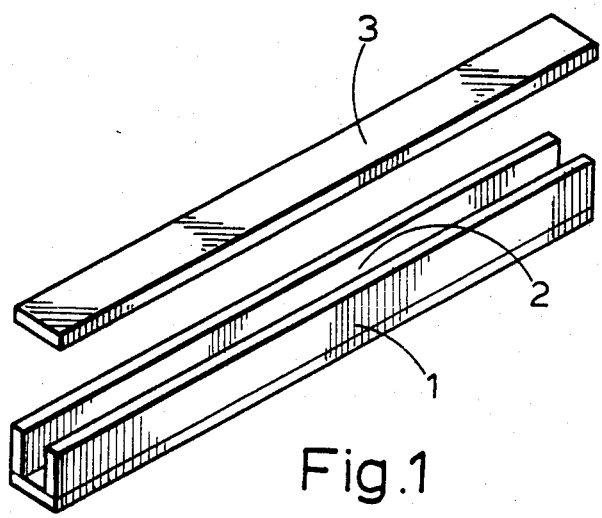
FIG. 1 shows a perspective view of a support member and of a matching optional cover plate.

In FIG. 1, the support member 1 comprises three plates stuck together. This affords a member of external square or rectangular cross section save for, in one of the four longitudinal faces, a channel 2 of square or rectangular cross section. The optional cover plate 3 is of the same length and overall width as the support member.

In order to make a connection, the coatings of two optical fibres are stripped back sufficiently far to permit fusion splicing of their ends. However, the length of the support member and the stripped lengths are such that the splice can be placed in the channel 2 with the coatings extending into the channel. This means that when the channel is filled with adhesive all exposed fibre and also the ends of the coating are held and protected against damage and moisture ingress.

To use the cover plate 3, the channel is filled to the brim with adhesive and the plate is applied before the adhesive is cured. In this way subsequent inspection of the splice in the vertical direction is unimpeded by curved surfaces arising from surface tension effects.

Typical dimensions for the support member of FIG. 1 would be as follows: length 25 mm, external cross-section 2 to 3 mm in each direction, channel width 1 mm, and channel depth 1 to 2 mm.

In FIG. 2, a completed connection is shown in cross-section in the close vicinity of the fusion splice. The support member and channel are once more designated as 1 and 2. The channel is filled with adhesive up to the cover plate 3. Lying in channel 2 is optical fibre with its coating 5 stripped back from the plane of the section. The support member is located for inspection between 45° prisms 6 and 7. Light from a source passes along path 8 through the splice to microscope objective 9.

In FIG. 3, the source and the objective have been moved laterally relative to the prisms and the connection, but not rotationally. The splice can be inspected in a direction at right angles to the direction of inspection in FIG. 2, along path 10.

The inspections as shown in FIGS. 2 and 3 may be performed in white light. However, clearer images may be obtained by using light comprising a relatively narrow range of wavelengths. White light which has been passed through a coloured filter has been found satisfactory, and even more so light which has been passed through a narrow bandpass interference filter.

For practical convenience, the image of the microscope whose objective is 9 is preferably viewed not directly but on a television screen.

Figure 4:
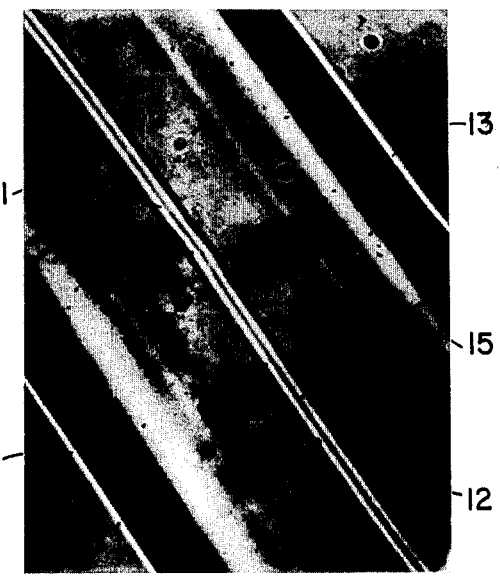
FIG. 4 shows a photograph of a splice taken with the arrangement of FIG. 2.
Figure 5:
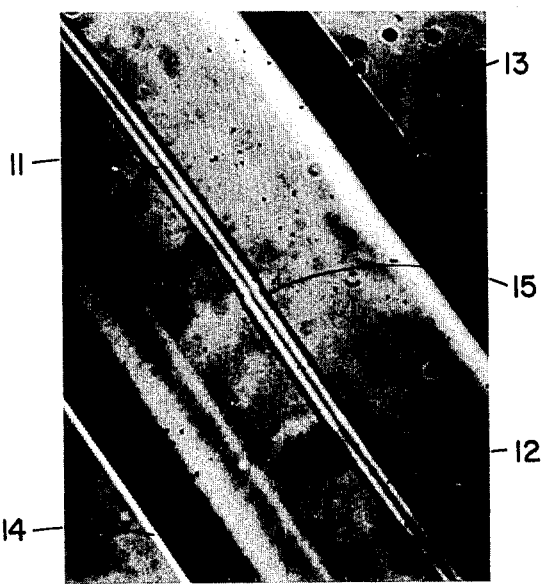
FIG. 5 shows a photograph of the same splice taken with the arrangement of FIG. 3.

FIGS. 4 and 5 show photographs taken of a splice with the arrangements of FIGS. 2 and 3 respectively. The diameter of cores 11, 12 are 8 μm and the outer diameters of the claddings 13, 14 are 125 μm. The adhesive used was Norland optical adhesive 63, cured in ultraviolet light, of refractive index 1.56. The fibres were silica fibres with germania-doped cores, and the support member and cover plate were of silica. The fusion joint of the cores 15 can be seen clearly.

Figure 6:
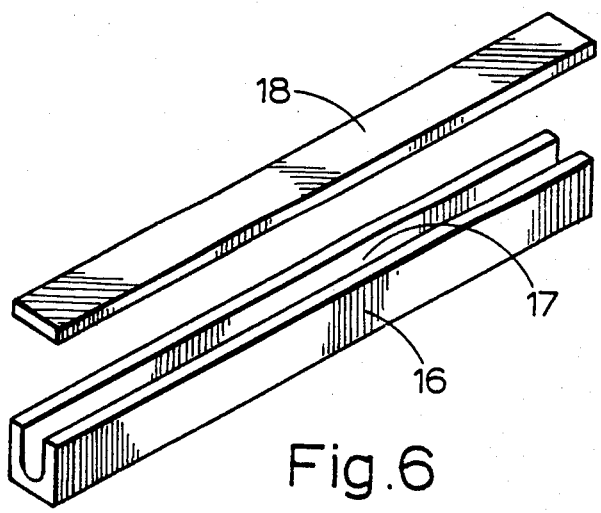
FIG. 6 shows a perspective view of a further form of support member with an optional cover plate.

In FIG. 6, the further form of support member 16 is a one-piece construction. This has been made by machining a U-shaped channel 17 in a rectangular or square-section rod. While we have achieved satisfactory results with such support members, optical smoothness of the channel surfaces is harder to achieve than with the three-part construction of FIG. 1. Once more, a cover plate 18 may be used in combination with the support member.

Trial and error experiments with both liquids and adhesives indicate that satisfactory index matching can be achieved for quite a wide range of adhesive refractive index. Thus, for silica fibres, support members, and cover plates, the refractive index of these being 1.46±0.01, adhesives of refractive index from 1.3 to 1.6 would appear to offer good results. Beyond these values of adhesive refractive index, refraction effects at the curved fibre surface begin to obscure the image of the core which can be obtained. It will be clear that the images of the core obtained improve as the adhesive refractive index approaches that of the cladding. However, in principle, very close matching of the adhesive refractive index to the outermost layer of the cladding of the fibre would be somewhat disadvantageous, since the surface of the cladding if visible imports a scale to the microscope image; but we have not experienced this problem in practice.

It is envisaged that in submarine cable work the two views of every splice in the cable will be recorded photographically or on videotape. This will facilitate quality control in on-site inspection and monitoring of fusion machine performance. In addition, these videotape records will facilitate analysis of splice performance over the lifetime of the cable.

I claim:

1. A method of making a connection beteween two optical fibres, each fibre having a core and a cladding, whereby inspection of the joint between the cores in the connection is facilitated, which comprises the steps of:
   (i) fusion splicing the ends of the fibres,
   (ii) fixing the splice and the adjacent portions of the two fibers in a transparent support member by means of a transparent adhesive matched in refractive index to the cladding of the fibre, and
   (iii) transmitting light transversely to the fibres through said transparent support and forming an image of the fibre splice using said transversely transmitted light.

2. A method according to claim 1 wherein the refractive index of the adhesive lies in the range 1.3 to 1.6.

3. A method according to claim 1, wherein the splice and the adjacent portions of the two fibres are fixed in a channel in the support member.

4. A method according to claim 3, wherein the support member is elongate and of square or rectangular cross section save for the channel, which is in one of the four longitudinal faces.

5. A method according to claim 3 wherein the channel is of square or rectangular cross section, or is U-shaped.

6. A method according to claim 1, wherein the support member is of a borosilicate glass or of silica.

7. A method according to claim 1, wherein the adhesive employed is an epoxy resin.

8. A method according to claim 1, wherein the adhesive employed is a silicone resin.

9. A method according to claim 1, which comprises the additional step of:
   (iii) fixing a transparent cover plate to the support member, thereby enclosing the fibre and adhesive with the support member and the cover plate.

10. A method according to claim 1, wherein the two optical fibres are monomode fibres.

11. A method of inspection of a connection according to claim 1, which comprises viewing the joint between the cores in two directions at right angles by means of a microscope.

12. A method according to claim 11, which comprises viewing the joint by means of light transmitted through the region of the splice.

13. A method of inspection of a connection according to claim 5, which comprises the steps of:
 (a) locating a 45° prism adjacent to one of the planar longitudinal faces of the support member, and
 (b) viewing the fibre splice in two directions at right angles by means of a microscope whose position is adjusted therefor without rotation relative to the support member.

14. A method according to claim 13, wherein a second 45° prism is located adjacent to a longitudinal face of the support member and illumination for the viewing of the fibre splice is provided by means of a source whose position is adjusted therefor without rotation relative to the support member.

15. A method of inspection of a connection according to claim 9, which comprises the steps of:
 (a) locating a 45° prism adjacent to one of the planar longitudinal faces of the support member or cover plate, and
 (b) viewing the fibre splice in two directions at right angles by means of a microscope whose position is adjusted therefor without rotation relative to the support member.

16. A method according to claim 15, wherein a second 45° prism is located adjacent to a longitudinal face of the support member or cover plate and illumination for the viewing of the fibre splice is provided by means of a source whose position is adjusted therefor without rotation relative to the support member.

17. A method of connecting and inspecting the tail ends of two optical fibers, each fiber having a core and a cladding, said method comprising the steps of:
 (a) fusion splicing at least the cores of said fiber tail ends;
 (b) adhesively assembling the resulting fused splice and adjacent portions of the two optical fibers within a transparent support member having generally planar opposed first and second side faces, each face being generally parallel to the longitudinal axis of the spliced fiber, using a transparent adhesive approximately matched in refractive index to the refractive index of the fiber cladding; and
 (c) transmitting light transversely through said spliced fiber by passing it into said first side face of the assembly and out of said second opposite side face and forming an image of said fused splice using said transmitted light.

18. A method as in claim 17 wherein said transparent support member includes further generally planar opposed third and fourth side faces each of which further faces is also generally parallel to the longitudinal axis of the spliced fiber, said method further comprising the step of:
 (d) transmitting additional light transversely through said spliced fiber by passing it into said third side face of the assembly and out of said fourth opposite side face and forming an image of said fused splice using said additional transmitted light.

19. A method as in claim 18 wherein said additional light is directed through said assembly along a direction that is substantially transverse to the direction along which light is directed through said first and second side faces.

20. A method as in claim 18 or 19 wherein at least one of said transmitting steps includes the use of reflective surfaces external to the assembly for directing light therethrough along a different radial angle without physically rotating said assembly.

* * * * *